(12) United States Patent
Jefremov

(10) Patent No.: US 7,817,625 B2
(45) Date of Patent: Oct. 19, 2010

(54) METHOD OF TRANSMITTING DATA IN A COMMUNICATION SYSTEM

(75) Inventor: Andrei Jefremov, Järfalla (SE)

(73) Assignee: Skype Limited, Dublin (IE)

( * ) Notice: Subject to any disclaimer, the term of this patent is extended or adjusted under 35 U.S.C. 154(b) by 146 days.

(21) Appl. No.: 12/075,801

(22) Filed: Mar. 12, 2008

(65) Prior Publication Data

US 2008/0225844 A1    Sep. 18, 2008

(30) Foreign Application Priority Data

Mar. 13, 2007   (GB) ................................ 0704834.1

(51) Int. Cl.
*H04L 12/66* (2006.01)
(52) U.S. Cl. .................................................. 370/352
(58) Field of Classification Search .......... 370/352–356
See application file for complete search history.

(56) References Cited

U.S. PATENT DOCUMENTS

| | | | |
|---|---|---|---|
| 5,768,527 A * | 6/1998 | Zhu et al. ................... | 709/231 |
| 6,067,534 A | 5/2000 | Terho et al. | |
| 6,141,565 A | 10/2000 | Feuerstein et al. | |
| 2002/0136164 A1 | 9/2002 | Fukuda et al. | |
| 2002/0141392 A1* | 10/2002 | Tezuka et al. ............... | 370/352 |
| 2003/0152032 A1 | 8/2003 | Yanagihara et al. | |
| 2005/0018768 A1 | 1/2005 | Mabey et al. | |
| 2007/0002840 A1 | 1/2007 | Song et al. | |
| 2007/0174881 A1 | 7/2007 | Idehara et al. | |
| 2008/0225750 A1 | 9/2008 | Jefremov | |
| 2008/0225844 A1 | 9/2008 | Jefremov | |

| | | |
|---|---|---|
| 2009/0234919 A1 | 9/2009 | Jefremov et al. |

FOREIGN PATENT DOCUMENTS

| | | |
|---|---|---|
| EP | 1 463 323 A1 | 9/2004 |
| WO | WO 97/22201 A | 6/1997 |
| WO | WO 2005/002261 A1 | 1/2005 |

(Continued)

OTHER PUBLICATIONS

Sato, et al., "Compressed Video Transmission Protocol Considering Dynamic QoS Control," *Architecture and OS Support for Multimedia Applications/Flexible Communication Systems/Wireless Networks and Mobile Computing*, 1998 ICPP Workshops; pp. 95-104 (Jan. 1998).

(Continued)

*Primary Examiner*—Frank Duong
(74) *Attorney, Agent, or Firm*—Hamilton, Brook, Smith & Reynolds, P.C.

(57) ABSTRACT

A method of transmitting a first signal from a first terminal to a second terminal via a communication network including: receiving at the first terminal a second signal from the second terminal; outputting the second signal from an output device associated with the first terminal and determining information relating to a characteristic of the second signal. A processing resource of the second terminal used to transmit the second signal is estimated, wherein the estimation is based on the information relating to the characteristic of the second signal. A characteristic of the first signal is adjusted in dependence on the estimated processing resource of the second terminal used to transmit the second signal and the first signal is transmitted to the second terminal.

18 Claims, 6 Drawing Sheets

FOREIGN PATENT DOCUMENTS

| WO | WO 2005/009019 A2 | 1/2005 |
|---|---|---|
| WO | WO 2008/027724 A1 | 3/2008 |

OTHER PUBLICATIONS

Notification of Transmittal of the International Search Report and the Written Opinion of the International Searching Authority, or the Declaration, PCT/EP2009/052916, 14 pp., mailed Jul. 10, 2009.

International Search Report, PCT/IB2008/001353, 4 pp., mailed Sep. 12, 2008.

International Search Report and Written Opinion for International Application No. PCT/B32007/004510, date of mailing Sep. 5, 2008.

* cited by examiner

METHOD OF TRANSMITTING DATA IN A COMMUNICATION SYSTEM

RELATED APPLICATION

This application claims priority under 35 U.S.C. §119 or 365 to Great Britain, Application No. 0704834.1, filed Mar. 13, 2007. The entire teachings of the above application are incorporated herein by reference.

TECHNICAL FIELD

The present invention relates to information processing systems such as communication systems. More particularly the present invention relates to a method and apparatus for receiving and transmitting information in a communication system.

BACKGROUND

In a communication system a communication network is provided, which can link together two communication terminals so that the terminals can send information to each other in a call or other communication event. Information may include speech, text, images or video.

Modern communication systems are based on the transmission of digital signals. Analogue information such as speech is input into an analogue to digital converter at the transmitter of one terminal and converted into a digital signal. The digital signal is then encoded and placed in data packets for transmission over a channel to the receiver of another terminal. This information may include an identification number and source address that uniquely identifies the packet, a header checksum used to detect processing errors and the destination address. The payload portion of the data packet includes information from the digital signal intended for transmission. This information may be included in the payload as encoded frames such as video frames, wherein each frame represents a portion of the video signal.

One type of communication network suitable for transmitting data packets is the internet. Protocols which are used to carry voice signals over an Internet Protocol network are commonly referred to as Voice over IP (VoIP). VoIP is the routing of voice conversations over the Internet or through any other IP-based network.

Conditions associated with the communication system, such as resource availability of communication terminals can affect the ability of the terminals to process data. For example, CPU (central processing unit) resources will affect how effectively the transmitting and receiving terminals can process information.

It is therefore necessary to optimize the manner in which information is processed and transmitted by the terminals in accordance with the conditions associated with the communication system.

In a known solution a receiving terminal may report to the transmitting terminal the CPU resource of the receiving terminal that is available to process the information received from the transmitting terminal. The transmitting terminal may then adjust the rate at which data is transmitted to the receiving terminal in dependence on the available CPU resource of the receiving terminal.

However during a two way communication event such as a video call, where each terminal transmits and receives video data, the users of each terminal may find that they experience a different quality of service during the call. For example, whilst one terminal receives a high quality signal the other terminal may receive a low quality signal. This is disadvantageous for both participants of the call since the call is likely to be terminated if even one participant of the call experiences poor call quality.

It is therefore an aim of the present invention to achieve a balanced quality of service among the participants of a communication event and to overcome the above identified problems.

SUMMARY

According to a first aspect of the present invention there is provided a method of transmitting a first signal from a first terminal to a second terminal via a communication network comprising: receiving at the first terminal a second signal from the second terminal; outputting the second signal from an output device associated with the first terminal; determining information relating to a characteristic of the second signal; estimating a processing resource of the second terminal used to transmit the second signal, wherein the estimation is based on the information relating to the characteristic of the second signal; adjusting a characteristic of the first signal in dependence on the estimated processing resource of the second terminal used to transmit the second signal; and transmitting the first signal to the second terminal.

Another aspect of the invention provides a method of transmitting a first signal from a first terminal to each of a plurality of second terminals via a communication network comprising: receiving at the first terminal a second signal from each of said second terminals; determining information relating to a characteristic of each of said second signals; estimating a processing resource of each second terminal used to transmit each second signal, wherein the estimation is based on the information relating to the characteristic of each of said second signals; adjusting a characteristic of the first signal transmitted to each second terminal in dependence on the estimated processing resource of each second terminal used to transmit each second signal; and transmitting each first signal to each second terminal.

Another aspect of the invention also provides a first terminal arranged to transmit a first signal to a second terminal via a communication network, said first terminal comprising: receiving circuitry arranged to receive a second signal from the second terminal; an output device arranged to output the second signal; a resource manager arranged to determine information relating to a characteristic of the second signal, to estimate a processing resource of the second terminal used to transmit the second signal, wherein the estimation is based on the information relating to the characteristic of the second signal and to adjust a characteristic of the first signal in dependence on the estimated processing resource of the second terminal used to transmit the second signal; and transmitting circuitry arranged to transmit the first signal to the second terminal.

Another aspect of the invention also provides a first terminal arranged to transmit a first signal to each of a plurality of second terminals via a communication network comprising: receiving circuitry arranged to receive a second signal from each of said second terminals; a resource manager arranged to determine information relating to a characteristic of each of said second signals, to estimate a processing resource of each second terminal used to transmit each second signal, wherein the estimation is based on the information relating to the characteristic of each of said second signals, and to adjust a characteristic of the first signal transmitted to each second terminal in dependence on the estimated processing resource of each second terminal used to transmit each second signal; and transmitting circuitry arranged to transmit each first signal to each second terminal.

The invention also provides a computer program product for implementing the above-defined methods.

Embodiments of the invention allow information relating to characteristics to be gathered in one place so that a decision concerning signal transmission characteristics can be made for all participants, not just to allow the host to adjust his signal transmission characteristics. That is, the host can advise participants of the signal they should send. That is, if information concerning signal characteristics is gathered in one place, it is possible to have a much better overview of what is happening in the conference and to make better decisions about required signal transmission characteristics for all participants. This does not add significantly to the transmission overhead, because the information relating to characteristics does not constitute a large amount of data. This concept can be utilised not only in conference calls, but also for one-to-one calls. For example, if caller A is engaged in a call with caller B, caller B can make decisions about what signal it is going to send to caller A and at the same time it will make decisions about what signal it wants caller A to send. The request concerning the type of signal that caller B wants caller A to send will be transmitted to caller A and then caller A can commence transmission using the signal characteristics defined in the request sent by caller B.

BRIEF DESCRIPTION OF THE DRAWINGS

For a better understanding of the present invention and to show how the same may be carried into effect, embodiments of the present invention will now be described with reference to the following drawings.

DETAILED DESCRIPTION

Figure 1:
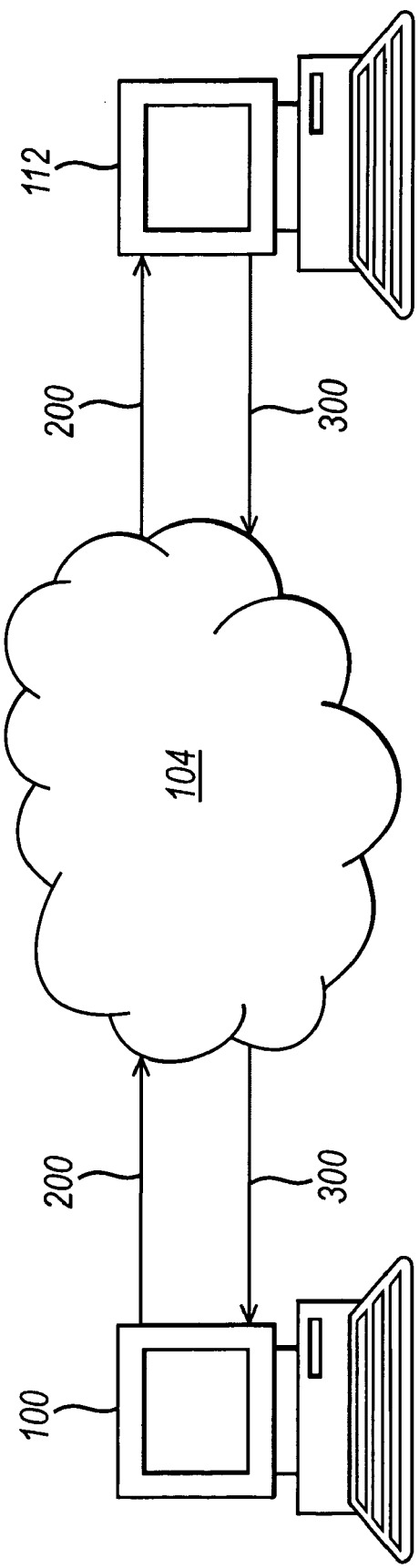
FIG. 1 shows a communication network.

Reference will first be made to FIG. 1, which shows a first terminal 100 and a second terminal 112 connected to a communication network 104. The terminals are arranged to transmit data, such as a media signal comprising audio data and video data, to each other via the communication network 104. In one embodiment of the invention the communications network is a VoIP network provided by the internet. It should be appreciated that even though the exemplifying communications system shown and described in more detail herein uses the terminology of a VoIP network, embodiments of the present invention can be used in any other suitable communication system that facilitates the transfer of data.

The terminals 100 and 112 may be, for example, a personal computer, a gaming device, a personal digital assistant, a suitably enabled mobile phone, a television or other device able to connect to the network 104. The terminals may be connected to the network via a wired or wireless connection that employs a particular access technology such as Ethernet, WiFi, WiMax (Worldwide Interoperability for Microwave Access), 3G (third generation).

As shown in FIG. 1 the first terminal 100 transmits a signal 200 to the second terminal 112. The second terminal is arranged to transmit a signal 300 to the first terminal 100. The signal 300 transmitted from the second terminal to the first terminal will hereinafter be referred to as the reply signal 300 in order to clearly distinguish between the two signals. It should therefore be appreciated that term reply signal 300 is used only to indicate the direction in which the signal is transmitted and is not limited to occurring within the same communication event or at the same time as the signal 200.

Figure 2:
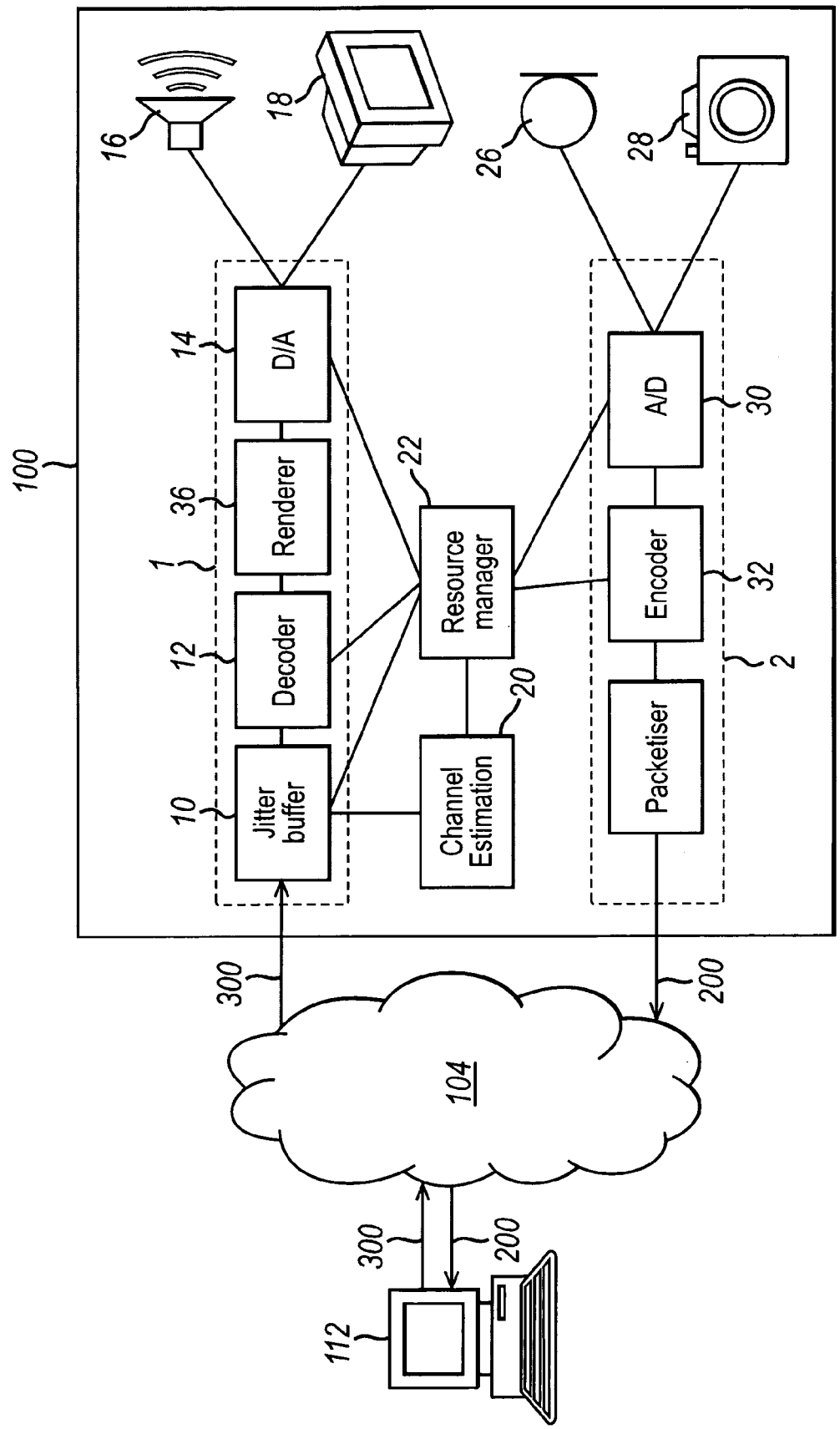
FIG. 2 shows a first terminal according to an embodiment of the invention.

Reference will now be made to FIG. 2. FIG. 2 shows the first terminal 100 in detail. The first terminal 100 includes receiving circuitry I for receiving data transmitted via the network 104 and transmitting circuitry 2 for transmitting data via the network 104. It should be appreciated that the second terminal 112 may also comprise similar transmitting and receiving circuitry.

The transmitting circuitry of the terminal 100 is arranged to receive data input from input devices such as a microphone 26 and a webcam 28 and to transmit the data in the signal 200 to the second terminal 112 via the network 104. The transmitting circuitry comprises an analogue to digital converter 30 for converting analogue data input from an analogue input device into digital information, an encoder 32 for encoding the digital information into encoded data frames and a packetiser 42 for placing the encoded data frames data in packets before transmitting the data.

The receiving circuitry is arranged to output data received in the reply signal 300 from the second terminal 112 to various output devices such as a loudspeaker 16 and a display screen 18. The receiving circuitry comprises a jitter buffer 10 for buffering data packets received from the network, a decoder 12 for decoding the data received in the data packets, a renderer block 36 for handling video data to be output to the display screen 18 and a digital to analogue converter 14 for outputting analogue data to analogue output devices.

The terminal 100 also includes a channel estimation unit 20 and a resource manager block 22.

The channel estimation unit 20 is arranged to receive an input from the receiving circuitry. The channel estimation unit 20 is arranged to determine characteristics of the data received via the network 104. When the second terminal 112 transmits a reply signal 300 to the first terminal 100 the channel estimation unit is arranged to determine characteristics of the reply signal 300. In accordance with an embodiment of the invention the channel estimation unit is arranged to determine characteristics of the reply signal 300 from which the CPU resource availability of the second terminal can be estimated.

The characteristics of the reply signal determined by the channel estimation unit may include for example the frame rate or the bit rate of the signal. The characteristics of the reply signal 300 are then input into the resource manager block 22.

In accordance with an embodiment of the invention the resource manager block 22 of the terminal 100 is arranged to estimate the CPU resources of the second terminal 112 used to transmit the reply signal based on the characteristics of the reply signal 300, and to adjust the characteristics of the signal 200 transmitted to the second terminal accordingly. For example the resource manager may be arranged to determine that the CPU resources of the second terminal are low if the frame rate of the reply signal is below a threshold value. If it is determined that the CPU resources of the second terminal 112 are low, the data rate of the signal 200 transmitted from the first terminal to the second terminal will be reduced to below a threshold value to ensure that the signal 200 does not overload the resources of the second terminal. Furthermore, this allows the second terminal to increase the CPU resources allocated to transmitting the reply signal to the first terminal 100.

If however it is determined that the CPU resources of the second terminal are high the frame rate of the signal 200 may be increased to above a threshold value. This forces the second terminal to allocate greater CPU resource to processing the received signal 200 and may reduce the CPU resource available for transmitting the reply signal 300 to the first terminal.

Characteristics of the reply signal 300 and the signal 200 that may be determined and adjusted according to embodiments of the invention include but are not limited to the frame rate of the signal, the bit rate of the signal and the resolution of each frame in the signal. Whilst embodiments of the invention describe adjusting the frame rate of the signal, it should be appreciated that any characteristic that affects the CPU requirement to process the signal may be adjusted according to embodiments of the present invention.

In accordance with a further embodiment of the invention the characteristics of the reply signal 300 transmitted from the second terminal may be reported by the second terminal 112. As such the first terminal is not required to estimate the characteristics of the received reply signal 300. In this case the second terminal 112 may be arranged to report the frame rate of the reply signal 300 transmitted to the first terminal 100. This will be explained with reference to FIG. 3.

Figure 3:
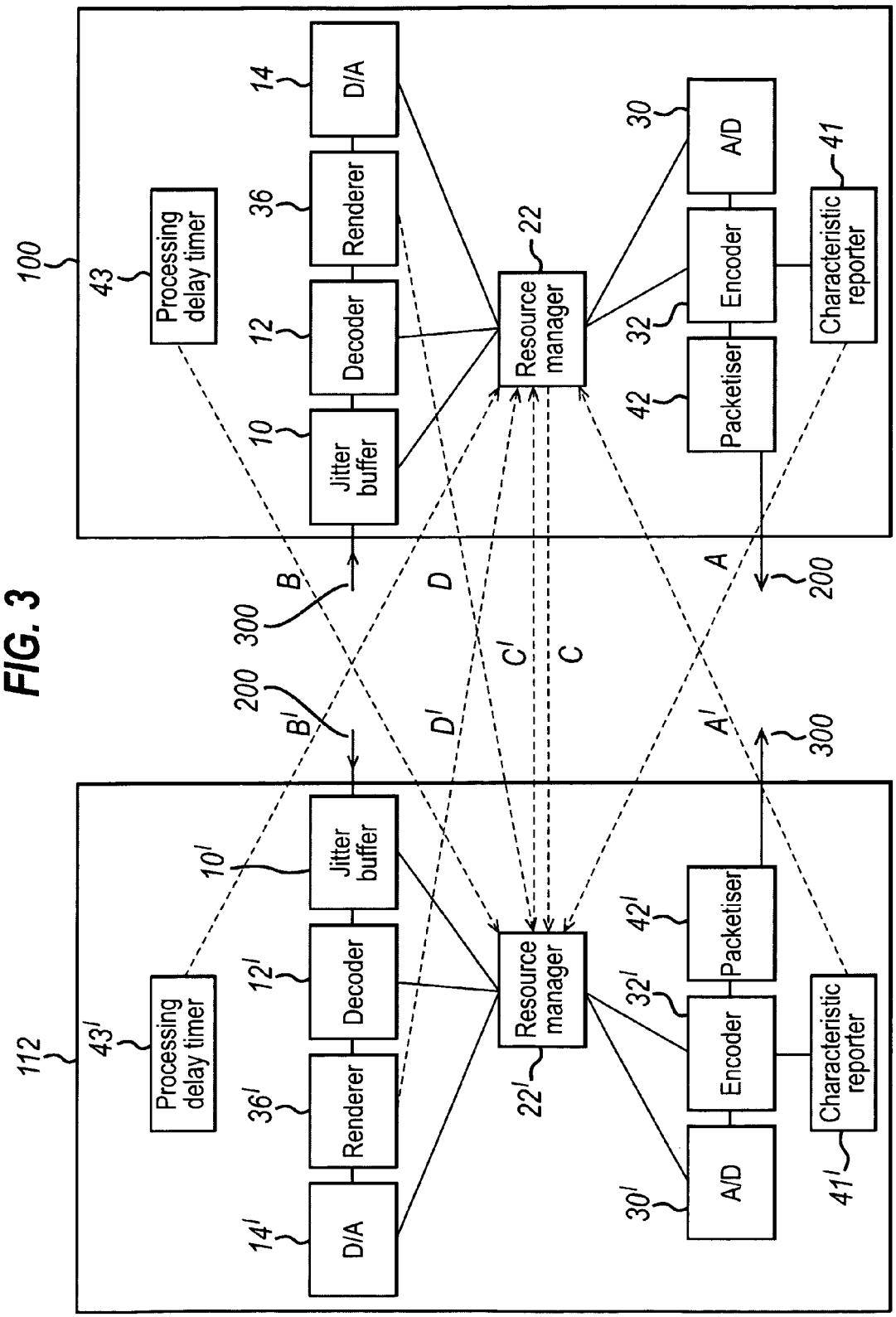
FIG. 3 shows a first and second terminal according to an embodiment of the invention.

FIG. 3 shows the first terminal 100 and the second terminal 112 in detail.

As shown in FIG. 3 the second terminal comprises a characteristic reporter unit 41'. The characteristic reporter unit 41' is arranged report characteristics of the reply signal 300 to the first terminal. In one embodiment of the invention the characteristic reporter unit 41' is arranged to determine the rate at which frames are output from the encoder 32' of the second terminal and to report the frame rate as a value A'. The frame rate value A' may be encoded with the data transmitted in the reply signal before it is inserted into a data packet by the packetiser 42' and transmitted in a data packet to the first terminal 100. Alternatively the value A' may be reported in a separate logical control channel.

The data packet is received and decoded by the receiving circuitry of the first terminal 100. The decoded frame rate value A' is input into the resource manager 22. The resource manager is arranged to estimate the CPU resource of the second terminal 112 using the frame rate value A', and to control the frame rate of the signal 200 transmitted to the second terminal in dependence of the estimated CPU resource.

Similarly the first terminal may also comprise a characteristic reporter unit 41 arranged to report characteristics of the signal 200 to the second terminal 122. In one embodiment of the invention the characteristic reporter unit 41 may be arranged to report the rate at which frames are output from the encoder 32. The frame rate value A of the signal 200 may be reported to the resource manager 22' of the second terminal 112. The resource manager 22' of the second terminal may then estimate the CPU resource of the first terminal using the frame rate value A and control the frame rate of the signal transmitted to the first terminal in dependence on the estimated CPU resource.

In a further embodiment of the invention, information on the rate at which the receiving circuitry 1' of the second terminal 112 is able to process the signal 200 transmitted from the first terminal 100 may be used together with the characteristics of the reply signal 300 transmitted from second terminal to adjust a characteristic of the signal 200. This will be explained with reference again to FIG. 3.

As shown in FIG. 3, the second terminal 112 may also comprise a processing delay timer 43'. The processing delay timer 43' is arranged to determine the time taken for a packet of the signal 200 received from the first terminal to be processed by the receiving circuitry 1'. The processing delay timer 43' may be arranged to measure the time between when a packet of the signal 200 arrives at the jitter buffer 10' and when frames from the packet are output from the renderer 36'. The processing delay timer may then determine how many frames per second the receiving circuitry may process.

The number of frames per second that the receiving circuitry 1' can process is reported as a value B' to the first terminal. The number of frames per second B' may be encoded and transmitted from the second terminal 112 to the first terminal together with the reply signal 300.

The value B' representing the number of frames per second that the receiving circuitry 1' of the second terminal can process is input into the resource manager 22 of the first terminal 100.

In accordance with an embodiment of the invention the resource manager 22 of the first terminal 100 is arranged to compare the value B' representing the number of frames per second that the receiving circuitry 1' of the second terminal can process, with the value A' representing the frame rate of the reply signal 300 in order to determine whether the data rate of the signal 200 should be adjusted. This will be described with reference to FIG. 4.

Figure 4:
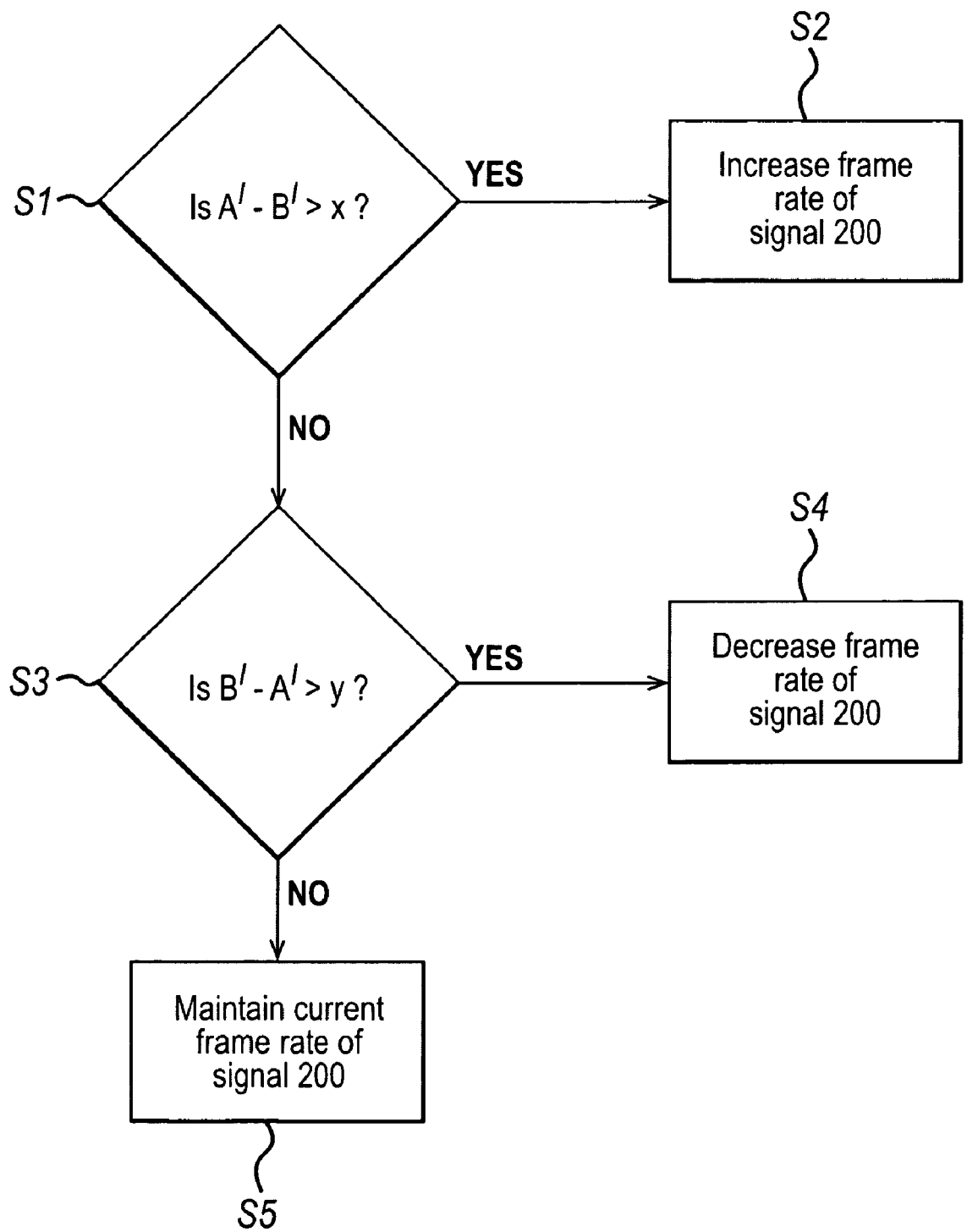
FIG. 4 is a flow chart illustrating a method according to an embodiment of the present invention.

As shown in FIG. 4, in step S1 it is determined if the value of A' is greater than the value B' by more than a predetermined amount x.

If the value of A' is greater than the value B' by more than the predetermined amount x, the method continues to step S2.

In step S2 the resource manager 22 of the first terminal is arranged to instruct the encoder 32 to increase the frame rate of the signal 200 transmitted to the second terminal, thus forcing the resource manager 22' of the second terminal 112 to allocate greater CPU resources for processing the signal 200 and to reduce the CPU resources for transmitting the reply signal 300.

If the value of A' is not greater than the value B' by the predetermined amount x, the method continues to step S3.

In step S3 it is determined if the value of B' is greater than the value A' by more than a predetermined amount y.

If the value of B' is greater than the value A' by more than the predetermined amount y, the method continues to step S4.

In step S4 the resource manager 22 of the first terminal is arranged to instruct the encoder 32 to decrease the frame rate of the signal 200 transmitted to the second terminal, thus reducing the CPU resources required to process the signal 200 and allowing the resource manager of the second terminal to allocate greater CPU resources to transmitting the reply signal 300.

If the value of A' is less than the value B' by less than the predetermined amount y, the method continues to step S5.

In step S5 the resource manager 22 of the first terminal is arranged to maintain the current frame rate of the signal 200.

Similarly a processing delay timer 43 may be provided in the first terminal 100. The processing delay timer 43 of the first terminal may be arranged to report to the number of frames per second that the receiving circuitry 1 can process. The resource manager 22' of the second terminal may then adjust the frame rate of the reply signal 300 according to the method described with reference to FIG. 4.

According to a further embodiment of the invention, information on the available CPU resource of the second terminal 112 may be used together with the characteristics of the reply signal 300 to adjust the frame rate of the signal 200. This will be explained with reference again to FIG. 3.

The resource manager 22' of the second terminal 112 may be arranged to report the available CPU resource to the first terminal. If the available CPU resource of the second terminal is greater than a threshold value the resource manager 22' of the second terminal is arranged to report to the first terminal that the available CPU resource is high. Conversely, if the available CPU resource of the second terminal is below a threshold value the resource manager 22' of the second terminal is arranged to report to the first terminal that the available CPU resource is low.

A value C' reporting whether the available CPU resource of the second terminal is high or low is encoded and transmitted together with the reply signal 300 to the first terminal.

At the first terminal the value C' reporting the available CPU resource of the second terminal is input into the resource manager 22 of the first terminal.

In accordance with an embodiment of the invention the resource manager 22 of the first terminal 100 is arranged to adjust the data rate of the signal 200 in dependence on the value B' representing the number of frames per second that the receiving circuitry 1' of the second terminal can process, the value A' representing the frame rate of the reply signal 300 and the value C' reporting the available CPU resource at the second terminal. This will be described with reference to FIG. 5.

Figure 5:
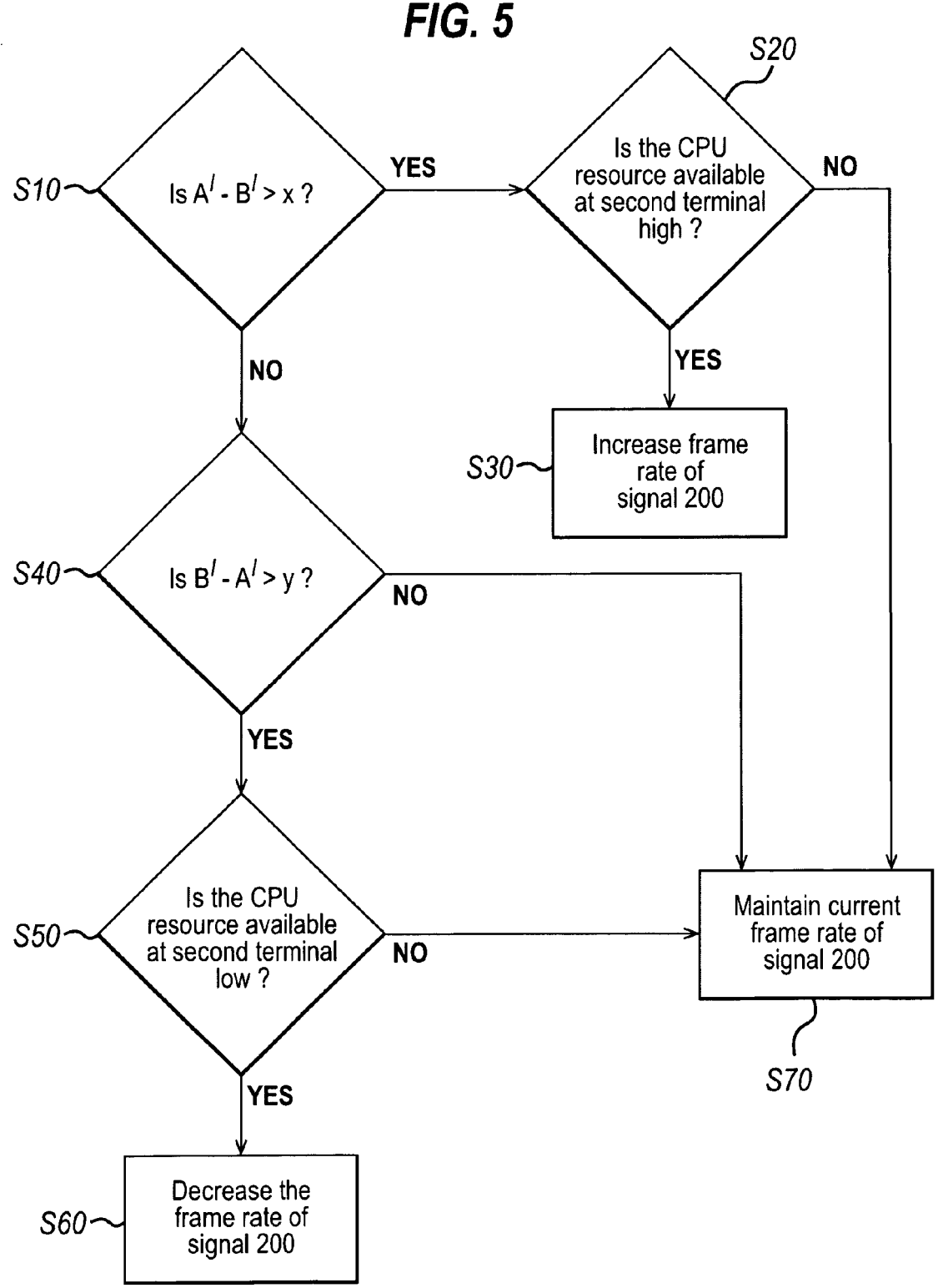
FIG. 5 is a flow chart illustrating a method according to a further embodiment of the present invention.

As shown in FIG. 5, in step S10 it is determined if the value of A' is greater than the value B' by more than a predetermined amount x.

If the value of A' is greater than the value B' by more than the predetermined amount x, the method continues to step S20.

In step 20 it is determined if the value C' indicates that the available CPU resource of the second terminal is high. If it is determined that the available CPU resource of the second terminal is high the method continues to step S30 In step S30 the resource manager 22 of the first terminal is arranged to instruct the encoder 32 to increase the frame rate of the signal 200 transmitted to the second terminal, thus forcing the resource manager 22' of the second terminal 112 to allocate greater CPU resources for processing the signal 200.

If it is determined in step 20 that the available CPU resource of the second terminal is low the method continues to step S70.

If it is determined in step S10 that the value of A' is not greater than the value B' by more than the predetermined amount x, the method continues to step S40.

In step S40 it is determined if the value of B' is greater than the value A' by more than a predetermined amount y.

If the value of B' is not greater than the value A' by more than the predetermined amount y, the method continues to step S70.

If the value of B' is greater than the value A' by more than the predetermined amount y, the method continues to step S50.

In step S50, it is determined if the value C' indicates that the available CPU resource of the second terminal is low. If it is determined that the available CPU resource of the second terminal is low the method continues to step S60 In step S60 the resource manager 22 of the first terminal is arranged to instruct the encoder 32 to decrease the frame rate of the signal 200 transmitted to the second terminal, thus reducing the CPU resources required to process the signal 200 and allowing the resource manager of the second terminal to allocate greater CPU resources to transmitting the reply signal 300.

If in step S50 it is determined that the available CPU resource of the second terminal is high the method continues to step S70.

In step S70 the resource manager 22 of the first terminal is arranged to maintain the current frame rate of the signal 200.

Similarly the resource manager 22 of the first terminal 100 may be arranged to report the available CPU resource of the first terminal to the second terminal. The resource manager 22' of the second terminal may then adjust the frame rate of the reply signal 300 according to the method described with reference to FIG. 5.

In accordance with a further embodiment of the invention, information relating to the display screen 18 used to display the signal 200 may be used together with the characteristics of the reply signal 300 to adjust the frame rate of the signal 200.

Referring again to FIG. 3 the renderer 36' of the second terminal 112 may be arranged to report to the first terminal information relating to the display screen of the second terminal. For example the renderer may report the resolution used to display the video data in the signal 200. Alternatively the renderer may report if the resolution of the display screen is greater or less than a threshold value.

A value D' representing the resolution of the display screen of the second terminal may be encoded and transmitted together with the reply signal 300 to the first terminal.

At the first terminal the value D' representing the resolution of the display screen of the second terminal is input into the resource manager 22 of the first terminal.

In accordance with an embodiment of the invention the resource manager 22 of the first terminal 100 is arranged to adjust the data rate of the signal 200 in dependence on the resolution of the display screen of the second terminal 112. For example, if the resolution of the display screen is high, the resource manager 22 of the first terminal may instruct the encoder 32 of the first terminal to encode the video data with a high resolution. This may be achieved by, for example, reducing the frame rate or increasing the bit rate available to the encoder 32.

The resource manager 22 of the first terminal may use the resolution of the display screen of the second terminal indicated by the value D' in combination with any of the above identified values in order to adjust the characteristics of the signal 200.

In particular, in the case where a fixed bit rate is available to the encoder 32, if it is reported that the resolution of the display screen of the second terminal is above a threshold value the resource manager may prevent the frame rate of the signal 200 from increasing even if the values A' B' or C' indicate that the frame rate should be increased, in order to retain the resolution of each frame. If however it is reported that the resolution of the display screen of the second terminal is below a threshold value the resource manager may allow the frame rate of the signal 200 to increase.

In one embodiment of the invention the signal 200 and the reply signal 300 occur within the same communication event, such as a video call between a user of the first terminal and a user of the second terminal.

In an alternative embodiment of the invention the signal 200 and the reply signal 300 may relate to different communication events. For example the signal 200 may comprise a video signal transmitted during a call and the reply signal 300 may comprise a file transfer.

In a further embodiment of the invention more than two terminals may be arranged to transmit and receive signals to and from each other. For example this may occur during a video conference call as shown in FIG. 6.

Figure 6:
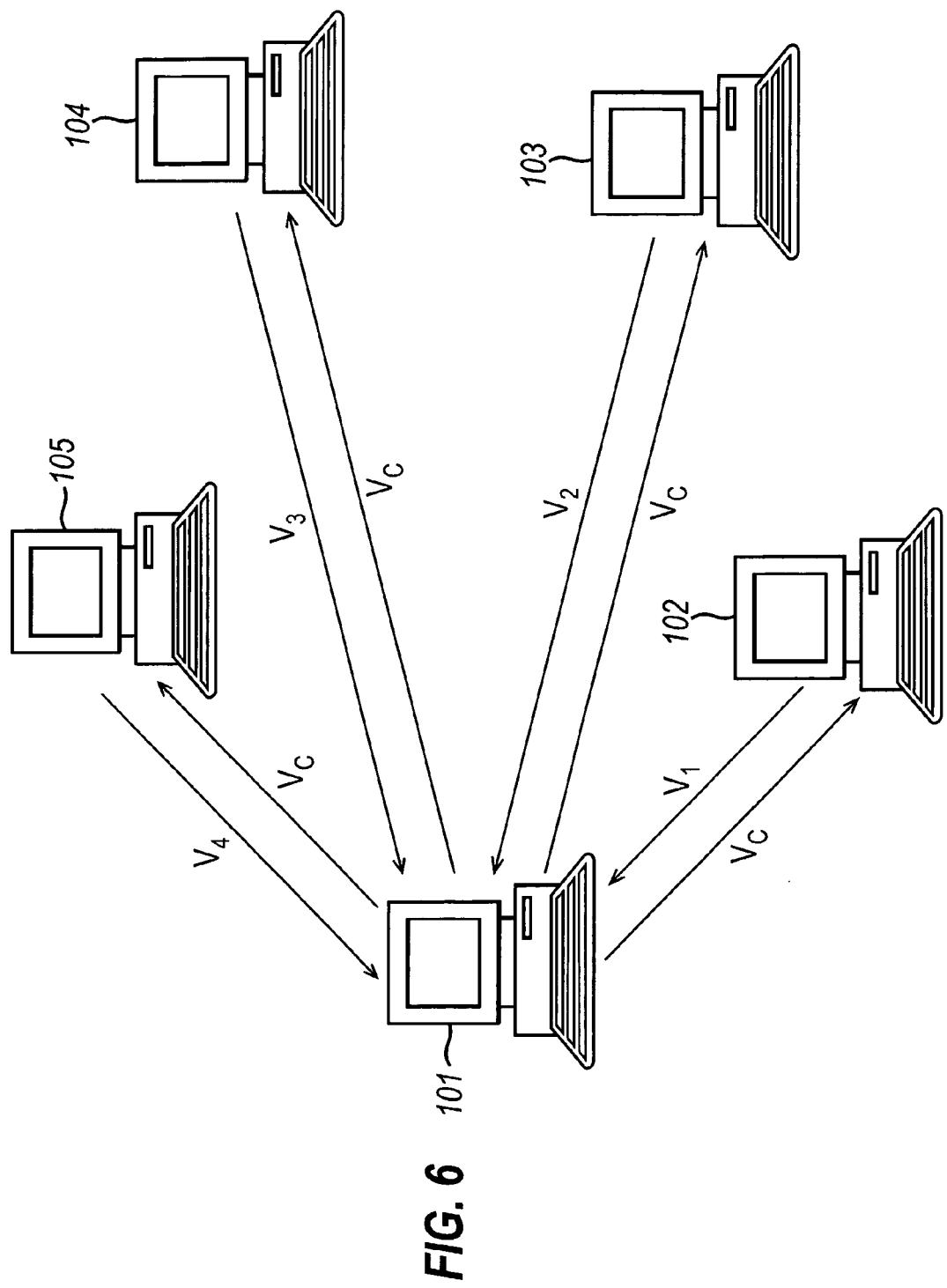
FIG. 6 shows an arrangement of terminals configured to communicate in a video conference call.

In FIG. 6 the five terminals 101, 102, 103, 104 and 105 are arranged to communicate in a video conference call. Terminal 101 operates as the host terminal of the conference call. As such, the other terminals participating in the conference call transmit video signals V1, V2, V3 and V4 to the host terminal 101. The host terminal is arranged to combine the video signals and to transmit the combined video signal Vc to each of the other terminals.

In accordance with an embodiment of the invention the host terminal is arranged to estimate the CPU resource of each terminal using characteristics of the video signal received from each terminal. The characteristics of each video signal may be estimated at the host terminal 101 or reported by each of the other terminals participating in the conference call.

The host terminal may then adjust a characteristic of the combined video signal Vc transmitted to each terminal in dependence on the estimated CPU resource for each terminal. The adjustment of the characteristic of the combined video signal may also be based on other conditions reported from the terminals, such as processing delay time and screen resolution as described above.

The host can then send commands to each participant to the conference, that is the host will adjust its own sending quality of combined video streams and also advise to each participant the quality it expects them to send, as opposed to each participant having to make its own decision without necessarily knowing about other participants. The characteristics data may be gathered in one place to allow the decision to be made in one place, so that a request can be made to each participant about the kind of video and quality to send.

It will be appreciated that the characteristic data does not have to be routed along the same path(s) as the video data itself, although generally they will. However, for scenarios where "everyone is sending to everyone" video data could be sent directly to each other. Without gathering characteristic data centrally, this could result in one- to-one optimisations. To improve this, the characteristic data can be sent to one "main" party which decides characteristic data for all participants.

In embodiments of the present invention the required processing may be implemented as hardware or by using appropriately adapted software executed on a processor. Software for implementing the invention may be stored on and provided by means of a carrier medium such as a carrier disc, card or tape. A possibility is to download the software via a data network. This is an implementation issue.

It will be appreciated that embodiments of the invention can be applied in different conferencing architectures.

While this invention has been particularly shown and described with reference to preferred embodiments, it will be understood to those skilled in the art that various changes in form and detail may be made without departing from the scope of the invention as defined by the claims.

What is claimed is:

1. A method of transmitting a first signal from a first terminal to a second terminal via a communication network comprising:
   receiving at the first terminal a second signal from the second terminal;
   outputting the second signal from an output device associated with the first terminal;
   determining information relating to a characteristic of the second signal;
   estimating a processing resource of the second terminal used to transmit the second signal, wherein the estimation is based on the information relating to the characteristic of the second signal;
   adjusting a characteristic of the first signal in dependence on the estimated processing resource of the second terminal used to transmit the second signal; and
   transmitting the first signal to the second terminal.

2. A method as claimed in claim 1, wherein the step of determining information relating to a characteristic of the second signal comprises estimating the characteristic of the second signal at the first terminal.

3. A method as claimed in claim 1, wherein the step of determining the information relating to a characteristic of the second signal comprises receiving reported information from the second terminal relating to a characteristic of the second signal.

4. A method as claimed in claim 1, wherein the step of estimating the processing resource of the second terminal used to transmit the second signal comprises comparing the information relating to a characteristic of the second signal with information relating to a processing resource of the second terminal used to process the first signal.

5. A method as claimed in claim 4, wherein the information relating to the processing resource of the second terminal used to process the first signal is reported by the second terminal to the first terminal.

6. A method as claimed in claim 1, wherein the information relating to a characteristic of a second signal is the frame rate of the second signal.

7. A method as claimed in claim 4, wherein the information relating to the processing resource of the second terminal used to process the first signal is a frame rate of the first signal that the second terminal is able to process.

8. A method as claimed in claim 1, wherein the information relating to characteristic of the second signal is a resolution of each frame in the second signal.

9. A method as claimed in claim 4, wherein the information relating to the processing resource of the second terminal used to process the first signal is a resolution of each frame in the first signal that the second terminal is able to process.

10. A method as claimed in claim 1, wherein the second terminal is arranged to report the resolution of a display screen used to display the first signal.

11. A method as claimed in claim 10, wherein if the resolution of the display screen used to display the first signal is greater than a first threshold value the resolution of the first signal is not adjusted below a second threshold value.

12. A method of transmitting a first signal from a first terminal to each of a plurality of second terminals via a communication network comprising:
   receiving at the first terminal a second signal from each of said second terminals;
   determining information relating to a characteristic of each of said second signals;
   estimating a processing resource of each second terminal used to transmit each second signal, wherein the estimation is based on the information relating to the characteristic of each of said second signals;
   adjusting a characteristic of the first signal transmitted to each second terminal in dependence on the estimated processing resource of each second terminal used to transmit each second signal; and
   transmitting each first signal to each second terminal.

13. A method as claimed in claim 12, wherein the first signal comprises at least one of the second signals.

14. A method as claimed in claim 12, wherein the first terminal is a host terminal of a conference call.

15. A method as claimed in claim 1, wherein the first terminal transmits a request to the second terminal defining characteristics to be used for transmission of the second signal.

16. A first terminal arranged to transmit a first signal to a second terminal via a communication network, said first terminal comprising:
   receiving circuitry arranged to receive a second signal from the second terminal;
   an output device arranged to output the second signal;
   a resource manager arranged to determine information relating to a characteristic of the second signal, to estimate a processing resource of the second terminal used to transmit the second signal, wherein the estimation is based on the information relating to the characteristic of the second signal and to adjust a characteristic of the first signal in dependence on the estimated processing resource of the second terminal used to transmit the second signal; and
   transmitting circuitry arranged to transmit the first signal to the second terminal.

17. A first terminal arranged to transmit a first signal to each of a plurality of second terminals via a communication network comprising:
   receiving circuitry arranged to receive a second signal from each of said second terminals;
   a resource manager arranged to determine information relating to a characteristic of each of said second signals, to estimate a processing resource of each second terminal used to transmit each second signal, wherein the estimation is based on the information relating to the characteristic of each of said second signals, and to adjust a characteristic of the first signal transmitted to each second terminal in dependence on the estimated processing resource of each second terminal used to transmit each second signal; and
   transmitting circuitry arranged to transmit each first signal to each second terminal.

18. A computer program product comprising program code when executed by one or more processors causes the one or more processor to transmit a first signal from a first terminal to a second terminal via a communication network, the computer program product having program code that:
   receives at the first terminal a second signal from the second terminal;
   outputs the second signal from an output device associated with the first terminal;
   determines information relating to a characteristic of the second signal;
   estimates a processing resource of the second terminal used to transmit the second signal, wherein the estimation is based on the information relating to the characteristic of the second signal;
   adjusts a characteristic of the first signal in dependence on the estimated processing resource of the second terminal used to transmit the second signal; and
   transmits the first signal to the second terminal.

* * * * *